United States Patent
Fischer et al.

(10) Patent No.: US 9,073,082 B2
(45) Date of Patent: Jul. 7, 2015

(54) METHOD FOR PRODUCING HOMOGENEOUSLY MATTED COATINGS BY RADIATION CURING

(71) Applicants: Allnex IP S.à.r.l, Luxembourg (LU); BASF Coatings GmbH, Münster (DE)

(72) Inventors: Wolfgang Fischer, Meerbusch (DE); Nusret Yuva, Burscheid (DE); Ludger Keweloh, Sendenhorst (DE); Antje Meier, Wallenhorst (DE)

(73) Assignees: BASF Coatings GmbH, Muenster (DE); Allnex IP S.Á.R.L., Luxemburg (DE)

( * ) Notice: Subject to any disclaimer, the term of this patent is extended or adjusted under 35 U.S.C. 154(b) by 0 days.

(21) Appl. No.: 14/366,754

(22) PCT Filed: Dec. 17, 2012

(86) PCT No.: PCT/EP2012/075846
§ 371 (c)(1),
(2) Date: Jun. 19, 2014

(87) PCT Pub. No.: WO2013/092521
PCT Pub. Date: Jun. 27, 2013

(65) Prior Publication Data
US 2014/0371384 A1    Dec. 18, 2014

(30) Foreign Application Priority Data
Dec. 20, 2011 (EP) .................................. 11194422

(51) Int. Cl.
*C08F 2/46* (2006.01)
*C08G 61/04* (2006.01)
*B05D 3/06* (2006.01)
*B05D 5/02* (2006.01)
*C09D 133/08* (2006.01)
*C09D 133/14* (2006.01)
*B05D 3/04* (2006.01)
*B05D 3/02* (2006.01)

(52) U.S. Cl.
CPC .............. *B05D 3/067* (2013.01); *B05D 3/0486* (2013.01); *B05D 3/062* (2013.01); *B05D 5/02* (2013.01); *B05D 3/0209* (2013.01); *C09D 133/08* (2013.01); *C09D 133/14* (2013.01)

(58) Field of Classification Search
USPC .................................................. 522/1; 520/1
See application file for complete search history.

(56) References Cited

U.S. PATENT DOCUMENTS

2003/0130369 A1* 7/2003 Wright .............................. 522/4

FOREIGN PATENT DOCUMENTS

| | | |
|---|---|---|
| DE | 10-2006-042063 | 3/2008 |
| DE | 10-2008-024149 | 12/2009 |
| DK | 102006042063 | * 3/2008 |
| EP | 0578957 | 1/1994 |
| EP | 1914215 | 4/2008 |

OTHER PUBLICATIONS

Rolf et al, DE 102006042063 Machine Translation, Mar. 6, 2008.*
PCT International Search Report in PCT/EP2012/075846, mailed Jan. 24, 2013, 3 pages.

* cited by examiner

*Primary Examiner* — Ling Choi
*Assistant Examiner* — Jessica E Whiteley
(74) *Attorney, Agent, or Firm* — Servilla Whitney LLC

(57) ABSTRACT

The present invention relates to a method for producing matt and scratch-resistant coatings that takes place under exposure to actinic radiation on coating systems containing activated double bonds under radical polymerization.

11 Claims, No Drawings

METHOD FOR PRODUCING HOMOGENEOUSLY MATTED COATINGS BY RADIATION CURING

CROSS-REFERENCE TO RELATED APPLICATIONS

This application is the National Stage entry of PCT/EP2012/075846, filed on Dec. 17, 2012, which claims priority to European Application Number 11194422.9, filed on Dec. 20, 2011, which are incorporated herein by reference in their entireties.

FIELD

The present invention relates to a method for producing matt and scratch-resistant coatings that takes place under exposure to actinic radiation on coating systems containing activated double bonds under radical polymerisation.

BACKGROUND

The curing of coating systems containing activated double bonds by actinic radiation, such as UV light or electron beam radiation for example, is known and is established in industry. Actinic radiation is understood to be electromagnetic, ionising radiation, in particular electron beams, UV beams and visible light (Roche Lexikon Medizin, 4th edition; Urban & Fischer Verlag, Munich 1999). It is one of the fastest curing methods in coating technology. Coating agents based on this principle are therefore referred to as radiation-curing or actinically curing or curable systems.

Formulations in which all constituents crosslink by radical polymerisation, i.e. systems having a solids content of 100 wt. %, are an embodiment of radiation-curing coating systems. The absence of volatile constituents only slightly reduces the applied coating thickness of these systems having a solids content of 100 wt. % during the curing process. This slight shrinkage makes it more difficult to produce matt surfaces by the simple addition of conventional matting agents to the coating formulation. An alternative to producing matt surfaces with the aforementioned coating systems is for example the mechanical structuring of the uncured surfaces by means of appropriately structured rollers or by applying films having a defined structure, as disclosed for example in EP-A 1 914 215 or EP-A 0 578 957. The films having a defined structure are removed again once the coating has cured. However, such methods are difficult in terms of reproducibility and very labour-intensive.

The pretreatment of radiation-curable coating systems with high-energy radiation in a wavelength range of <230 nm to produce very matt coating surfaces is also known, as disclosed for example in Schubert et al. Farbe+Lack 117/5 (2011) p. 21 ff, Bauer et al. Progress in Org. Coatings 69 (2010) p. 287-293 and Bauer et al.

SUMMARY

Provided are methods of producing matt and scratch-resistant coatings that take place under exposure to actinic radiation on coating systems containing activated double bonds under radical polymerisation. Also provided are substrates coated by the methods disclosed herein.

Progress in Org. Coatings 64 (2009) p. 474-481. The effect achieved by this pretreatment with short-wave UV light in the range ≤230 nm is a photochemically induced micro-folding of the coating. This micro-folding is responsible for a very matt surface. Full curing of the paint coat below the folded surface then takes place with conventional UV emitters such as for example mercury medium-pressure emitters or electron beam emitters.

This matting method is however only suitable for coatings that are applied in low coating thicknesses of up to approximately 20 μm. With higher coating thicknesses above approximately 20 μm, a heterogeneous wrinkling occurs, leading to rough, defective and unacceptable surface structures. Therefore for coating thicknesses above 20 μm the hitherto known method is unsuitable, as the surface structure is unacceptable.

The object of the present invention was therefore to provide a simple method for producing homogeneous very matt coatings that is also suitable for radiation-curable coatings having coating thicknesses of more than 20 μm.

Surprisingly it has now been found that homogeneous and very matt coatings are possible even with thick coatings if the corresponding radiation-curable coating agent is irradiated in a preliminary step with long-wave UV radiation, which causes a partial gelation of the coating agent.

DETAILED DESCRIPTION

The invention therefore provides a method for producing matt coatings, characterised in that
(1) a radiation-curable coating agent is applied to a substrate,
(2) the radiation-curable coating from step (1) is irradiated with UV light having a wavelength from ≥200 nm to ≤420 nm, preferably from ≥280 nm to ≤420 nm, in a radiation dose from 25 to 120 mJ/cm$^2$, preferably from 30 to 100 mJ/cm$^2$,
(3) the coating obtained from step (2) is irradiated with UV light having a wavelength from ≥120 nm to ≤230 nm, preferably from ≥150 nm to ≤225 nm, particularly preferably 172 nm, and
(4) the coating obtainable from step (3) is finish-cured by means of actinic radiation.

The invention also provides the objects coated by the method according to the invention.

The method according to the invention is described in more detail below.

Suitable radiation-curable coating agents for step (1) contain
a) one or more radiation-curable binders
b) optionally one or more reactive thinners to reduce the viscosity
c) one or more photoinitiators
d) optionally additives, light stabilisers, stabilisers, etc.
e) optionally pigments
f) optionally further fillers
g) optionally solvents
h) optionally matting agents Polymers and/or oligomers containing at least one, in particular at least two double bonds that can be activated by actinic radiation are suitable as the binder according to a). These polymers and/or oligomers conventionally have a number-average molecular weight from 250 to 50,000 g/mol, preferably from 500 to 25,000 g/mol, in particular from 700 to 5000 g/mol. They preferably have a double bond equivalent weight from 100 to 4000 g/mol, particularly preferably from 300 to 2000 g/mol. They are preferably used in an amount from 5 to 99 wt. %, preferably 10 to 90 wt. %, particularly preferably 20 to 80 wt. %, relative in each case to the solids content of the coating agents according to the invention. The number-average molecular weight of the binders is determined by means of gel permeation chromatography with polystyrene as the standard and tetrahydrofuran as the mobile phase.

Within the context of this invention "(meth)acrylate" relates to corresponding acrylate or methacrylate functions or to a mixture of the two.

Examples of suitable radiation-curable binders derive from the oligomer and/or polymer classes of (meth)acrylic-functional (meth)acrylic copolymers, polyether (meth)acrylates, polyester (meth)acrylates, epoxy (meth)acrylates, urethane (meth)acrylates, amino (meth)acrylates, melamine (meth) acrylates, silicone (meth)acrylates and phosphazene (meth) acrylates. Binders are preferably used that are free from aromatic structural units. Urethane (meth)acrylates, phosphazene (meth)acrylates and/or polyester (meth)acrylates are preferably used, particularly preferably urethane (meth)acrylates, most particularly preferably aliphatic urethane (meth)acrylates.

To reduce the viscosity, low-molecular-weight monomers containing double bonds, known as reactive thinners b), can be added to the binders described above.

Compounds that likewise (co)polymerise under radiation curing and are thus incorporated into the polymer network can also be used as reactive thinners b). Suitable reactive thinners b) containing at least one, in particular at least two compounds that can be activated by actinic radiation are olefinically unsaturated monomers, preferably vinyl-aliphatic monomers, and acrylates, in particular acrylates, having at least one radically polymerisable double bond and preferably having at least two radically polymerisable double bonds. Suitable reactive thinners are described in detail in Römpp Lexikon Lacke and Druckfarben, Georg Thieme Verlag, Stuttgart, N.Y., 1998 "Reaktivverdünner", pages 491 and 492.

Esters of acrylic acid or methacrylic acid, preferably of acrylic acid, with monofunctional or polyfunctional alcohols are mentioned as reactive thinners by way of example. Suitable alcohols are for example the isomeric butanols, pentanols, hexanols, heptanols, octanols, nonanols and decanols, also cycloaliphatic alcohols such as isobornol, cyclohexanol and alkylated cyclohexanols, dicyclopentanol, aryl aliphatic alcohols such as phenoxyethanol and nonylphenyl ethanol, and tetrahydrofurfuryl alcohols. Alkoxylated derivatives of these alcohols can also be used. Suitable dihydric alcohols are for example alcohols such as ethylene glycol, 1,2-propanediol, 1,3-propanediol, diethylene glycol, dipropylene glycol, the isomeric butanediols, neopentyl glycol, 1,6-hexanediol, 2-ethyl hexanediol and tripropylene glycol, and also alkoxylated derivatives of these alcohols. Preferred dihydric alcohols are 1,6-hexanediol, dipropylene glycol and tripropylene glycol. Suitable trihydric alcohols are glycerol or trimethylolpropane or alkoxylated derivatives thereof. Tetrahydric alcohols are pentaerythritol or alkoxylated derivatives thereof. A suitable hexahydric alcohol is dipentaerythritol or alkoxylated derivatives thereof. The alkoxylated derivatives of the cited trihydric to hexahydric alcohols are particularly preferred.

The coating agents according to the invention contain one or more photoinitiators c). The photoinitiator is activated by high-energy electromagnetic radiation, such as for example visible light or in particular UV radiation, e.g. light of wavelength 200 to 700 nm and thus initiates polymerisation by means of the groups that can be activated by actinic radiation that are contained in the coating agents according to the invention.

The photoinitiator is preferably selected from the group consisting of unimolecular (type I) and bimolecular (type II) photoinitators. Suitable type II photoinitiators are aromatic ketone compounds such as for example benzophenones in combination with tertiary amines, alkyl benzophenones, 4,4'-bis(dimethylamino)benzophenone (Michler's ketone), anthrone and halogenated benzophenones or mixtures of the cited types. Suitable type I photoinitiators are for example benzoins, benzoin derivatives, in particular benzoin ether, benzil ketals, acylphosphine oxides, in particular 2,4,6-trimethylbenzoyl diphenylphosphine oxides, bisacylphosphine oxides, phenylglycoxylic acid esters, camphorquinone, α-aminoalkyl phenones, α,α-dialkoxyacetophenones and α-hydroxyalkylphenones.

The coating agents can contain additives d). Suitable additives are for example light stabilisers, such as UV absorbers and reversible free-radical scavengers (HALS), antioxidants, degassing agents, wetting agents, emulsifiers, slip additives, polymerisation inhibitors, adhesion promoters, flow control agents, film-forming agents, rheological aids, such as thickeners and pseudoplastic sag control agents (SCAs), flame retardants, corrosion inhibitors, waxes, driers and biocides.

These and further suitable constituents are described in the textbook "Lackadditive" by Johan Bieleman, Wiley-VCH, Weinheim, N.Y., 1998 in D. Stoye and W. Freitag (Editors), "Paints, Coatings and Solvents", Second, Completely Revised Edition, Wiley-VCH, Weinheim, N.Y., 1998, "14.9. Solvent Groups", pages 327 to 373.

The coating agents can also be pigmented in accordance with e). They preferably then contain at least one pigment selected from the group consisting of organic and inorganic, transparent and opaque, colour-imparting and/or special effect-imparting and electrically conductive pigments. Suitable pigments e) and fillers f) are described for example in Lückert, Pigmente and Füllstofftabellen, Poppdruck, Langenhagen, 1994.

Solvents g) can optionally be added to the coating agents. Suitable solvents are inert in respect of the functional groups present in the coating agent, from the time at which they are added to the end of the process. Solvents used in coating technology for example are suitable, such as hydrocarbons, alcohols, ketones and esters, for example toluene, xylene, isooctane, acetone, butanone, methyl isobutyl ketone, ethyl acetate, butyl acetate, tetrahydrofuran, N-methyl pyrrolidone, dimethyl acetamide, dimethyl formamide.

The coating agents can also contain matting agents h). Suitable matting agents are for example silicon dioxide, which is adjusted to the necessary particle size for the corresponding coating. Alternatively, urea-methanal condensates or mixtures based on polyamide 12 can also be used.

According to the method according to the invention, in the first step (1) the coating agent is applied to a suitable substrate by the methods known to the person skilled in the art. The coating agent is applied to the substrate in coating thicknesses (before curing) of $\geq 5$ μm to $\leq 650$ μm, preferably $\geq 20$ μm to $\leq 600$ μm, particularly preferably $\geq 24$ μm to $\leq 500$ μm.

Suitable substrates for the method according to the invention are for example mineral substrates, wood, wood materials, metal, plastic, fibre-bonded materials, etc.

In step (2) the radiation-curable coating agent is irradiated with UV light of wavelength $\geq 200$ nm to $\leq 420$ nm, preferably $\geq 280$ nm to $\leq 420$ nm. The necessary radiation dose is in the range from 25 to 120 mJ/cm$^2$, preferably 30 to 100 mJ/cm$^2$. A partial gelation of the coating agent takes place in this step (2).

UV-A-emitting radiation sources (e.g. fluorescent tubes, LED technology or lamps, which are sold for example by Panacol-Elosol GmbH, Steinbach, Germany, under the name UV-H 254, Quick-Start UV 1200, UV-F 450, UV-P 250C, UV-P 280/6 or UV-F 900), high- or medium-pressure mercury vapour lamps, wherein the mercury vapour can be modified by doping with other elements such as gallium or iron, pulsed lamps (known as UV flash lamps) or halogen lamps, for example, are suitable as radiation sources for UV light in the specified wavelength range in step (2). Further suitable UV emitters or lamps are described in R. Stephen Davidson, "Exploring the Science, Technology and Applications of U.V. and E.B. Curing", Sita Technology Ltd., London, 1999, Chapter I, "An Overview", page 16, Figure 10, or Dipl.-Ing. Peter Klamann, "eltosch System-Kompetenz, UV-Technik, Leitfaden für Anwender", page 2, October 1998. The emitters can be installed in a fixed location, such that the item to be irradiated is moved past the radiation source by means of a mechanical device, or the emitters can be mobile and the item to be irradiated does not change its position during the partial gelation.

High- or medium-pressure mercury vapour lamps are preferably used in the method according to the invention in step (2), wherein the mercury vapour can be modified by doping with other elements such as gallium or iron.

The irradiation in step (2) preferably takes place under atmospheric conditions, in other words not under inert gas conditions and/or in an oxygen-reduced atmosphere.

Then in step (3) the coating obtained from step (2) is irradiated with UV light having a wavelength from ≥120 nm to ≤230 nm, preferably from ≥150 nm to ≤225 nm, particularly preferably 172 nm, causing micro-folding to occur.

Suitable radiation sources for step (3) are excimer UV lamps, which emit UV light in the range from ≥120 nm to ≤230 nm, preferably ≥150 nm to ≤225 nm, particularly preferably 172 nm. The micro-folding according to step (3) must take place in an oxygen-reduced atmosphere or under complete exclusion of oxygen, i.e. in an inert gas atmosphere. The curing in step (3) is particularly preferably performed in an inert gas atmosphere. An inert gas is understood to be a gas that under the applied curing conditions is not destroyed by actinic radiation, does not inhibit curing and does not react with the coating agents applied according to the invention. Nitrogen, carbon dioxide, combustion gases, helium, neon or argon are preferably used, particularly preferably nitrogen.

This nitrogen should contain only very small amounts of foreign gases such as oxygen for example. Degrees of purity of <300 ppm oxygen are preferably used.

The finish curing (step (4)) of the coating obtainable from step (3) takes place by means of actinic radiation such as for example UV radiation, electron beam radiation, X-ray radiation or gamma radiation. UV radiation in the wavelength range from ≥200 nm to ≤420 nm, preferably ≥280 nm to ≤420 nm, in a radiation dose from 80 to 4000 mJ/cm$^2$, preferably 80 to 2000 J/cm$^2$, particularly preferably 80 to 600 mJ/cm$^2$, and electron beam radiation (150 to 300 kV) in a dose of 10 to 100 kGy, preferably 20 to 50 kGy, are preferred. High- and medium-pressure mercury vapour lamps are used in particular as UV radiation sources, wherein the mercury vapour can be doped with further elements such as gallium or iron. Furthermore, UV-emitting LEDs and laser-pulsed lamps known as UV flash emitters are suitable. Suitable electron beam emitters are the known emitters of the scanner or curtain type.

The irradiation in step (4) can optionally also be performed with exclusion of oxygen, for example in an inert gas atmosphere or oxygen-reduced atmosphere. The irradiation can moreover take place by covering the coating with radiation-transparent media. Examples thereof are for example plastic films. For the finish curing in step (4) by electron beam radiation, the irradiation preferably takes place under inert gas conditions.

For the curing under atmospheric conditions the emitters can be installed in a fixed location, such that the item to be irradiated is moved past the radiation source by means of a mechanical device, or the emitters can be mobile and the item to be irradiated does not change its position during the finish curing.

For curing under inert gas conditions the emitters are preferably installed in a fixed location, such that the item to be irradiated is moved past the radiation source by means of a mechanical device.

In an embodiment of the method according to the invention the finish curing (4) takes place by means of UV radiation in the wavelength range from ≥200 nm to ≤420 nm, preferably ≥280 nm to ≤420 nm. The radiation dose is 80 to 4000 mJ/cm$^2$, preferably 80 to 2000 mJ/cm$^2$, particularly preferably 80 to 600 mJ/cm$^2$.

In a further embodiment of the method according to the invention the finish curing (4) takes place by means of electron beam radiation (70 to 300 kV) under inert gas conditions. The radiation dose is 10 to 100 kGy, preferably 20 to 50 kGy.

EXAMPLES

Unless otherwise specified, all percentages are percentages by weight.

Binder a1): Aliphatic allophanate-based urethane acrylate, viscosity (23° C.) 60,000 mPas, Mn=1100 g/mol.
Binder a2): Aliphatic polyester acrylate, Mn=720 g/mol.

TABLE 1

Composition of the coating agents

|  | I [wt. %] | II [wt. %] | III [wt. %] | IV [wt. %] |
|---|---|---|---|---|
| Binder a1) | 28.0 | 48.0 | | |
| Binder a2) | | | 46.0 | 23.0 |
| Hexanediol diacrylate b) | 35.0 | 42.7 | 13.0 | 21.0 |
| Tripropylene glycol diacrylate b) | | | 34.0 | 18.4 |
| Bis(2,4,6-trimethylbenzoyl) phenylphosphine oxide c) | 0.3 | | | 0.3 |
| 1-Hydroxycyclohexyl phenoylketone c) | | 3.5 | 3.2 | |
| 2,4,6-Trimethylbenzoyl phosphinic acid ethyl ester c) | | 0.6 | 0.6 | |
| Benzophenone c) | | | 1.0 | |
| Dispersing agent based on a copolymer having acid groups d) | 2.0 | | | |
| Dispersing agent based on a copolymer having filler-affinitive groups d) | | | | 0.8 |
| Matting agent based on precipitated silicas h) | 2.0 | 2.0 | 2.0 | 10.6 |
| Defoaming agent based on polysiloxanes d) | 0.2 | 0.2 | 0.2 | 0.1 |
| Sterically hindered amine light stabiliser d) | 1.0 | 1.2 | | |
| Hydroxyphenyl triazine derivative d) | 1.5 | 1.8 | | |
| Titanium dioxide e) | 30.0 | | | 25.8 |
|  | 100.0 | 100.0 | 100.0 | 100.0 |

The aforementioned coating agents I to IV, also referred to below as coating formulations, are applied in a coating thickness of 30 μm by means of a spiral blade on a fibre-reinforced mineral sheet (Europa board) and then radiation-cured by means of the following methods A1), A2), B1), B2), C1) and C2).

A1) Radiation curing of the coating agent by electron beam radiation (170 kV) (comparison).

A2) Radiation curing by UV radiation (UV emitter from IST, Nürtingen, DE, Hg medium-pressure emitter) (comparison).

B1) Irradiation with excimer emitter (172 nm) to achieve micro-folding, i.e. matting of the coating, and subsequent finish curing by electron beam radiation (170 kV) (comparison).

B2) Irradiation with excimer emitter (172 nm) to achieve micro-folding, i.e. matting of the coating, and subsequent finish curing by means of UV radiation (UV emitter from IST, Nürtingen, DE, Hg medium-pressure emitter) (comparison).

C1) Partial gelation by means of UV radiation (UV emitter from IST, Nürtingen, DE, gallium-doped Hg medium-pressure emitter), followed by irradiation with excimer emitter (172 nm) to achieve micro-folding, i.e. matting of the coating, and subsequent finish curing by means of electron beam radiation (170 kV).

C2) Partial gelation by means of UV radiation (UV emitter from IST, NÜrtingen, DE, gallium-doped Hg medium-pressure emitter), followed by irradiation with excimer emitter (172 nm) to achieve micro-folding, i.e. matting of the coating, and subsequent finish curing by means of UV radiation (UV emitter from IST, Nürtingen, DE, Hg medium-pressure emitter).

The radiation dose was measured with a radiometer from International Light Technologies, Peabody Mass., USA.

TABLE 2

Results of curing methods A1, A2, B1, B2, C1 and C2

| | Coating formulation | Curing method | UV dose (gelation) | Dose (finish curing) | Gloss 60°[1] |
|---|---|---|---|---|---|
| 1 (C) | I | A1 | — | 45 kGy | 87 U |
| 2 (C) | I | B1 | — | 45 kGy | 5 U surface not OK[2] |
| 3 | I | C1 | 50-100 mJ/cm² | 45 kGy | 5 U surface OK[3] |
| 4 (C) | II | A1 | — | 45 kGy | 87 U |
| 5 (C) | II | A2 | — | 250-300 mJ/cm² | 85 U |
| 6 (C) | II | B1 | — | 45 kGy | 5 U surface not OK[2] |
| 7 (C) | II | B2 | — | 250-300 mJ/cm² | 5 U surface not OK[2] |
| 8 | II | C1 | 50-100 mJ/cm² | 45 kGy | 5 U surface OK[3] |
| 9 | II | C2 | 50-100 mJ/cm² | 250-300 mJ/cm² | 5 U surface OK[3] |
| 10 (C) | III | A1 | — | 45 kGy | 87 U |
| 11 (C) | III | A2 | — | 250-300 mJ/cm² | 85 U |
| 12 (C) | III | B1 | — | 45 kGy | 5 U surface not OK[2] |
| 13 (C) | III | B2 | — | 250-300 mJ/cm² | 5 U surface not OK[2] |
| 14 | III | C1 | 50-100 mJ/cm² | 45 kGy | 5 U surface OK[3] |
| 15 | III | C2 | 50-100 mJ/cm² | 250-300 mJ/cm² | 5 U surface OK[3] |
| 16 (C) | IV | A1 | — | 45 kGy | 87 U |
| 17 (C) | IV | B1 | — | 45 kGy | 5 U surface not OK[2] |
| 18 | IV | C1 | 50-100 mJ/cm² | 45 kGy | 5 U surface OK[3] |

(C): Comparison
[1]The gloss at 60° was determined by measuring the gloss in accordance with DIN EN ISO 2813. U denotes gloss units.
[2]Surface not OK means: Surface of the coating not OK, i.e. after visual examination of the surface by the person skilled in the art the coating exhibits an irregular structure with wrinkles.
[3]Surface OK means: Surface of the coating OK, i.e. after visual examination of the surface by the person skilled in the art the coating exhibits a homogeneous structure without wrinkling.

All formulations I to IV result in homogeneous matt coatings using the method according to the invention (C1, C2). The results are identical, irrespective of whether the finish cure in step (4) took place with UV radiation or electron beam radiation.

Simple radiation curing (A1, A2) of formulations I to IV produces no matting effects in the surface of the coating.

Although matting of the coating of formulations I to IV by excimer radiation (B1, B2) leads to matt coatings, the surface structure is not satisfactory as an irregular surface structure with wrinkles forms.

Experiments with different coating thicknesses of the coating agents

TABLE 3

Coating agent V

| | V [parts by wt.] |
|---|---|
| Binder a1) | 48.0 |
| Hexanediol diacrylate b) | 44.9 |
| 1-Hydroxycyclohexyl phenoylketone c) | 3.5 |
| 2,4,6-Trimethylbenzoyl phosphinic acid ethyl ester c) | 0.6 |
| Defoaming agent based on polysiloxanes b) | 0.2 |
| Bis(1-octyloxy-2,2,6-tetramethyl-4-piperidyl) sebacate d) | 1.2 |
| 2-[4-[(2-Hydroxy-3-dodecyloxypropyl)oxy]-2-hydroxyphenyl]-4,6-bis(2,4-dimethylphenyl)-1,3,5-triazine & 2-[4-[(2-hydroxy-3-tridecyloxypropyl)oxy]-2-hydroxyphenyl]-4,6-bis(2,4-dimethylphenyl)-1,3,5-triazine d) | 1.6 |

The coating agent V was applied in a coating thickness of 24 µm by means of a spiral blade on a fibre-reinforced mineral sheet (Europa board) or in a coating thickness of 150 µm, 200 µm, 300 µm, 500 µm and 700 µm by means of an application frame on a fibre-reinforced mineral sheet (Europa board) and cured by means of the aforementioned curing methods B1) or C1).

TABLE 4

Curing methods according to the applied coating thicknesses

| | Coating thickness [µm] | Curing method | UV dose (gelation) | Dose (finish curing) | Coating[1] |
|---|---|---|---|---|---|
| 19 (C) | 24 | B1 | — | 45 kGy | Matt, surface not OK[2] |
| 20 | 24 | C1 | 100 mJ/cm² | 45 kGy | Matt, surface OK[3] |
| 21 | 150 | C1 | 100 mJ/cm² | 45 kGy | Matt, surface OK[3] |
| 22 | 200 | C1 | 100 mJ/cm² | 45 kGy | Matt, surface OK[3] |

TABLE 4-continued

Curing methods according to the applied coating thicknesses

| | Coating thickness [μm] | Curing method | UV dose (gelation) | Dose (finish curing) | Coating[1] |
|---|---|---|---|---|---|
| 23 | 300 | C1 | 100 mJ/cm² | 45 kGy | Matt, surface OK[3] |
| 24 | 500 | C1 | 100 mJ/cm² | 45 kGy | Matt, surface OK[3] |
| 25 (C) | 700 | C1 | 100 mJ/cm² | 45 kGy | No matting |

(C): Comparison

[1]The coating was assessed after curing by visual examination by a person skilled in the art.
[2]Surface not OK means: Surface of the coating not OK, i.e. after visual examination of the surface by the person skilled in the art the surface exhibits an irregular structure with wrinkles.
[3]Surface OK means: Surface of the coating OK, i.e. after visual examination of the surface by the person skilled in the art the surface exhibits a homogeneous structure without wrinkling.

The coatings produced by the method according to the invention result in homogeneously matt surfaces even with coating thicknesses of 24 μm (no. 20), whereas although the hitherto known method results in matt surfaces with coating thicknesses of 24 μm, they have an irregular structure with wrinkles (no. 19), and are therefore not acceptable.

The coatings produced by the method according to the invention (no. 21 to 24) have homogeneously matt surfaces up to a coating thickness of 500 μm. With a coating thickness of 700 μm, however, matting of the surface no longer occurs even by the method according to the invention (no. 25).

The invention claimed is:

1. A method for producing matt surfaces comprising:
   (1) applying a radiation-curable coating agent to a substrate;
   (2) irradiating the radiation-curable coating from step (1) with UV light having a wavelength from ≥200 nm to ≤420 nm in a radiation dose from 25 to 120 mJ/cm²,
   (3) irradiating the coating obtained from step (2) with UV light having a wavelength from ≥120 nm to ≤230 nm,
   (4) finish-curing the coating obtainable from step (3) by actinic radiation.

2. The method according to claim 1, wherein in step (2) the irradiation takes place with UV light having a wavelength from ≥280 nm to ≤420 nm.

3. The method according to claim 1, wherein in step (3) the irradiation takes place with UV light having a wavelength from ≥150 nm to ≤225 nm.

4. The method according to claim 1, wherein the radiation dose in step (2) is 30 to 100 mJ/cm².

5. The method according to claim 1, wherein the finish-curing in step (4) takes place with UV radiation at a wavelength from ≥200 nm to ≤420 nm in a radiation dose from 80 to 4000 mJ/cm².

6. The method according to claim 1, wherein the finish curing in step (4) takes place with electron beam radiation in a dose of 10 to 100 kGy.

7. The method according to claim 1, wherein in step (1) the coating agent comprises:
   a) one or more radiation-curable binders, and
   b) one or more photoinitiators.

8. The method according to claim 7, wherein the radiation-curable binder a) comprises an oligomer and/or polymer selected from the group consisting of (meth)acrylic copolymers, polyether (meth)acrylates, polyester (meth)acrylates, epoxy (meth)acrylates, urethane (meth)acrylates, amino (meth)acrylates, melamine (meth)acrylates, silicone (meth) acrylates and phosphazene (meth)acrylates.

9. The method according to claim 1, wherein in step (1) the coating agent is applied to the substrate in a coating thickness from ≥5 μm to ≤650 μm.

10. The method according to claim 1, wherein step (2) takes place under atmospheric conditions and step (3) takes place in an inert gas atmosphere.

11. A substrate coated by a method according to claim 1.

* * * * *